Oct. 29, 1968  R. F. SMITH  3,407,908
HYDRODYNAMIC RETARDER
Filed Feb. 1, 1967  4 Sheets-Sheet 1

INVENTOR,
RAY F. SMITH
BY Watson, Cole, Grindle & Watson
ATTORNEYS

Oct. 29, 1968  R. F. SMITH  3,407,908
HYDRODYNAMIC RETARDER
Filed Feb. 1, 1967  4 Sheets-Sheet 3

INVENTOR,
RAY F. SMITH
BY
Watson, Cole, Grindle & Watson
ATTORNEYS

Oct. 29, 1968　　　　　R. F. SMITH　　　　3,407,908
HYDRODYNAMIC RETARDER
Filed Feb. 1, 1967　　　　　　　　　　　　　　　　4 Sheets-Sheet 4

INVENTOR,
RAY F. SMITH
BY Watson, Cole, Grindle & Watson
ATTORNEYS

United States Patent Office 3,407,908
Patented Oct. 29, 1968

3,407,908
HYDRODYNAMIC RETARDER
Ray F. Smith, Berwick, Pa., assignor to Berwick Forge & Fabricating Corp., Berwick, Pa., a corporation of Pennsylvania
Filed Feb. 1, 1967, Ser. No. 613,355
23 Claims. (Cl. 188—90)

ABSTRACT OF THE DISCLOSURE

A device for retarding the forward motion of an automotive vehicle by generation of liquid turbulence by an impeller type turbine working within a stator housing with passageways being formed between the liquid pockets to prevent channeling and passages in the base of the impeller blades for priming during the loading operation. A forced air cooling system and automatic control arrangement to improve the loading and unloading operations are included.

---

The present invention relates generally to hydrodynamic brakes for use in retarding movement of motor vehicles and, more particularly, to such hydrodynamic brakes of the turbine type.

In the past, there have been several proposals in the direction of providing an efficient braking device particularly adapted for automotive type installations. These devices, generally speaking, rely on shearing and turbulence of a viscous liquid between a stationary vaned stator housing and a vaned impeller type turbine that is connected to the drive shaft of the vehicle to provide large quantities of brake horsepower by converting the same into frictional heat, which may then be dissipated through special cooling systems. These devices have greatly improved the safety and ease of operation of such heavy vehicles as tractor-trailer rigs and buses, by providing a controllable means for smoothly retarding the movement of the vehicle without relying on conventional surface friction brakes that are subject to fade, relatively short life, and other disadvantages. One such prior hydrodynamic braking device is illustrated in my previous patent, entitled Hydrodynamic Brake, U.S. Patent No. 3,108,660, issued Oct. 29, 1963.

While these prior art hydrodynamic brake units have thus been generally suitable for their designated purpose, prior to the present invention there have existed certain problems in providing a device which safely and reliably applies a predictable braking force over a wide range of speeds. One particular difficulty that has existed in the design of these devices is due to the fact that under certain conditions and circumstances the working fluid, which is usually a suitable lightweight oil, will begin to act as a friction-free bearing between the stator and the impeller rather than as a turbulent braking medium, which sudden loss of braking effect could have the serious consequences of allowing the truck or bus on which the device is installed to go out of control and be wrecked. This difficulty has been found to be due to oil becoming locked in the stator and impeller pockets whereby channeling of the oil or loss of turbulent interchange between the pockets occurs. In other words, if at any speed the oil in the device becomes locked in or static within the rotor and stator pockets, the oil at the interface space between the tops of the rotor vanes and the corresponding tips of the stator vanes begins to shear in layers without turbulence. Thus, the impeller begins to rotate without resistance since the oil, after losing its turbulence and forming distinct, adjacent layers at said interface, cannot act as a retarder but in fact can only act as fixed bearing surfaces sliding freely past each other cusing a run away of the brake.

This channeling effect of the oil has been in the past minimized or somewhat alleviated by various operational procedures, such as by rotating the impeller at increased speeds to thereby increase the fluid turbulence by use of planetary systems or the like, for example, as shown in my aforementioned previous patent. Althoungh this has proved successful in alleviating the problem to some degree, it will be recognized that this necessitates a substantial increase in moving parts and thus an increase in cost of the unit and also substantially increases the working pressure of the oil due to the increased speed of the rotating turbine. Other prior art attempts to eliminate this problem and to generally increase the overall operating capability and efficiency of hydrodynamic brakes have taken the form of providing multiple turbine sections in a single unit; but, here too, it is now clear that this approach has not been totally satisfactory and substantially increases the cost, size and weight of the unit, which are desired to be held to a minimum.

Accordingly, it is a principle object of the present invention to provide an improved hydrodynamic brake of the turbine type which is capable of efficient and reliable operation over a wide range of speeds.

It is another object of the present invention to provide a simplified, more economic hydrodynamic brake of the type described capable of maintaining braking effect over the full range of speeds.

It is still another object of the present invention to provide a hydrodynamic brake of the type described wherein the working pressure of the hydraulic fluid is maintained at a minimum or generally in the neighborhood of five lbs./sq. in.

It is another obpect of the present invention to provide a hydrodynamic brake with an improved forced air cooling system for generally improving the efficiency of the necessary cooling operation of the hydraulic fluid used in the brake as well as to improve the unloading characteristics of the same.

It is still a further object to provide an improved linkage system for controlling the operation of the loading valve of the hydrodynamic brake of the present invention.

To accomplish the foregoing main objective of the present invention, the hydrodynamic brake comprises a stator housing with stator blades forming radially inwardly facing fluid pockets, an impeller with rotor vanes which form rotative fluid pockets for cooperation with the stator pockets, said pockets serving to form a turbulent flow path along their length for the horsepower absorbing hydraulic fluid that continuously circulates through the brake, and passageway means formed in at least some of said vanes so as to provide separate fluid communication between the respective pockets. This basic design has been found to prevent the undesirable trapping of fluid in the pockets and thus, to prevent channeling of the fluid at any speed over the entire range of speeds for which the unit is designed. It will be recognized that this improved result is thus accomplished without the use of any moving parts and, furthermore, as will be seen later in detail, the proper selection of the size of these passageway means affords a simple, but effective manner of controlling the operational characteristics of the brake.

In accordance with related features of the present invention, these passageways are preferably formed in the outer stator vanes and adjacent the peripheral discharge means of the brake, which specific location has been found to aid in transferring the fluid from the turbulent flow path to the peripheral discharge ports of the stator housing in a controlled and efficient manner. Furthermore, the passageways are positioned at an angle so as to direct the fluid jets formed thereby in a reverse direction with regard to the turbulent flow path to aid in maintaining the desired horsepower-absorbing turbulence. The rotor vanes are preferably tapered in the direction opposite to the flow path along the rotor pockets to increase the pressure and prevent cavitation from occurring in the fluid adjacent the discharge ports. The efficiency of the turbulence is also favorably increased by the feature of providing stator vane segments at the ends of the stator pockets, which effectively divides the flow path into at least three different sections that exhibit diverse vortex characteristics thus insuring constant motion of the fluid back and forth between the stator and rotor pockets.

In addition to the brake of the present invention being designed to be self-unloading through the discharge ports when the brake is being disengaged, there are provided pumping blades along one face of the impeller to automatically load the brake upon opening of a loading valve. To enhance the loading characteristics of the brake, passage means are formed in the base of said blades adjacent the axially positioned intake duct and directed radially outward to thus prime each successive space between the blades as the impeller rotates. These primer passages have also been found to aid in initiating the desired turbulent condition of the fluid in these spaces prior to entering the pockets between the vanes, and accordingly are also a factor in improving the turbulence in the brake so as to aid in the prevention of undesirable channeling of the fluid.

According to other salient features of the invention, lower working pressure in the stator housing is attainable by preferably forming a plurality of series of ejection ports located at the periphery of said housing and which communicate with only selected ones of the stator pockets. For the ejection ports below the level of fluid in the outer housing that serves as a reservoir, there is advantageously provided transfer chambers which cause the fluid to exit above the critical level during the unloading operation and thus prevent retrogression of the hydraulic fluid through these ports when the brake is disengaged. Further, a novel forced air cooling system is provided, which is simple in construction yet very effective in operation, and which also plays a part in improving the unloading operation by maintaining superatmospheric pressure in the air chamber above the hydraulic fluid reservoir to thereby force the air into the brake in sufficient quantities to prevent the brake from having to work against a vacuum or partial vacuum when the brake is unloaded. This cooling system further includes a novel fluid cooler and blowdown unit which employs a series of vertical screens to recover the oil that is atomized during the unloading operation.

The automatic control for the hydrodynamic brake of the present invention is gained by a simple and very practical mechanical arrangement, which is interconnected directly with the accelerator for convenient actuation by the driver through selective actuation of said accelerator over a separate range of movement adjacent the normal idling position. This feature is realized through the use of a pivotal control lever and arcuate actuator lever combination and greatly improves the ease of operation of the device. With this feature, it has been found that little or no special training of the drivers is required and, indeed, that drivers soon become very skilled in utilizing the hydrodynamic brake of the present invention so that it is capable of assuming at least 80% of the normal braking operations. This has been proven to represent a very significant savings in terms of normal brake maintenance expense as well as to greatly improve the safety of the vehicle, especially in mountainous country where braking is frequent and severe. Furthermore, it will be recognized that this control of the vehicle is accomplished without necessitating the removal of the driver's foot from the accelerator, which in fact greatly reduces the fatigue of the driver on long trips. Also, in the general area of control of the loading valve, improvement has been made by the provision of counterweight means to positively operate the rotative valve member solely by gravity in response to the actuation of the above mentioned accelerator linkage to insure that the brake is engaged independently of springs or the like at all times when the accelerator is released.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Figure 1:
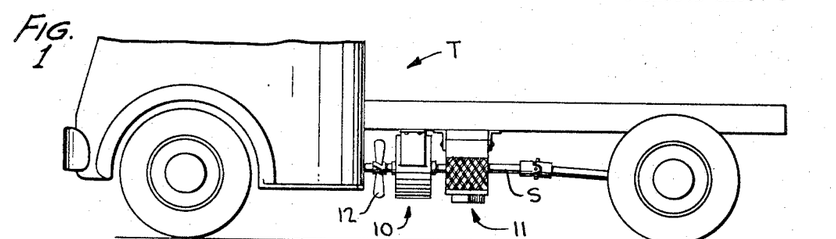
FIGURE 1 is a side view of a tractor vehicle upon which the hydrodynamic brake system of the present invention has been mounted for use.

Referring now to the drawings, there is shown in FIGURE 1 a truck T having a drive shaft S to which a hydrodynamic brake 10 incorporating the principles of the present invention is attached. Immediately behind the hydrodynamic brake 10 is a blowdown and cooler unit 11 which is also constructed in accordance with certain aspects of the present invention, and mounted just forward of the hydrodynamic brake 10 is a fan 12 which is utilized to advantage in combination with the cooling unit 11, as will be seen later in detail.

At thus attached to the truck T it will be clear to those skilled in this art, that the brake 10 operating through the drive shaft S is effective to apply a braking force to the rear wheels of said truck T when the same is engaged by the driver. Also, as is well known in the art, when it is desired for the truck T to travel in a normal manner and unimpeded by the brake 10, the same is disengaged, all as will become apparent upon further discussion. It should be noted in particular that the application of the brake 10 of the present invention to the truck T is merely for the purpose of illustrating one operative embodiment of the invention and that the brake 10 can be used with other types of automotive vehicles, such as buses, high speed trains, aircraft, or any other wheeled vehicle wherein it is desired to retard the speed of the vehicle from high speeds in a controlled manner.

Figure 2:
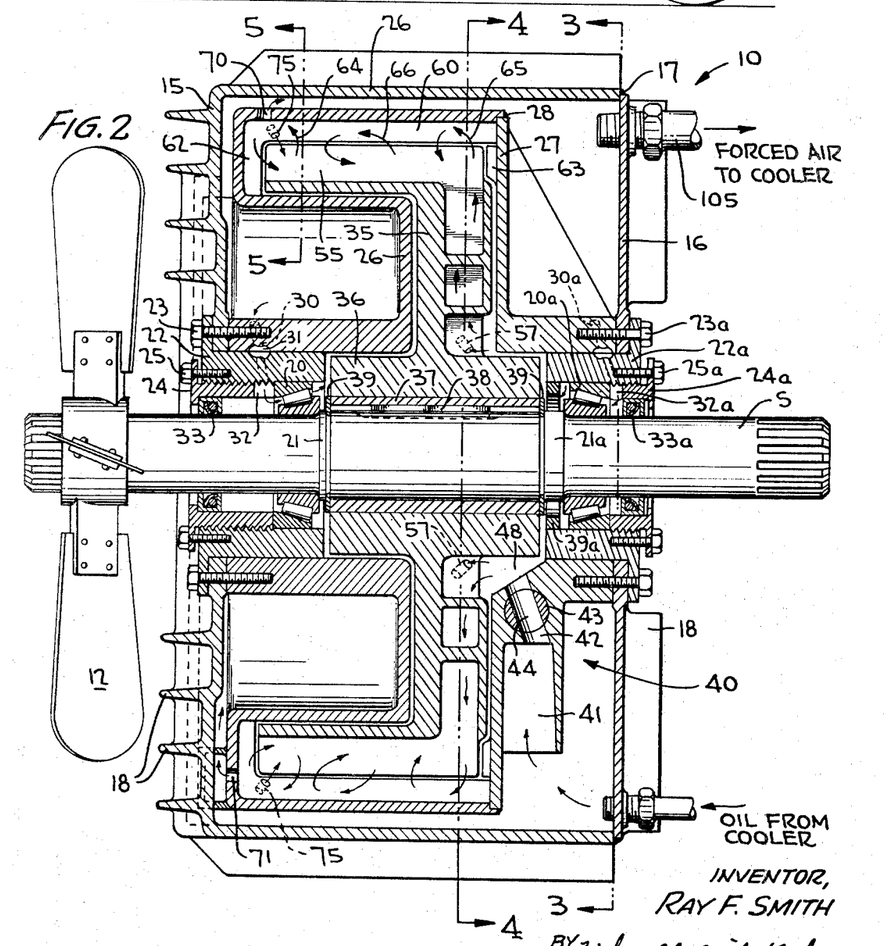
FIGURE 2 is a cross-sectional view taken along the center axis of the hydrodynamic brake constructed in accordance with the present invention.

Proceeding now with a detailed study of the hydrodynamic brake 10, reference can be made to FIGURE 2 wherein is shown in cross section an outer casing 15 which includes a cover plate 16 and serves as a permanent enclosure for the working elements of the brake 10. The cover plate 16 is preferably permanently welded around its periphery to the outer casing 15 as at 17 so that the brake 10 is sealed for life. This can be done since, as will be seen as the discussion progresses, the brake 10 is extremely simple with a minimum number of moving parts, and accordingly no maintenance is required during the life of the vehicle. As illustrated, the casing 15 and cover plate 16 may be provided with suitable cooling fins 18 to aid in dissipating some heat from the brake 10 directly to the atmosphere.

At the front and rear of the brake 10 are suitable roller bearings 20, 20a, respectively, for the purpose of mounting the drive shaft S for rotation; these bearings 20, 20a being suitably held in position against shoulders 21 21a on the shaft S by respective mounting sleeves 22, 22a that are positioned by any number of suitable bolts 23, 23a. The bearings 20, 20a are locked in position against their respective shoulders 21, 21a by the threaded locking nuts 24, 24a, which are locked with respect to the mounting sleeves 22, 22a by the locking bolts 25, 25a.

Concentrically mounted within the casing 15 by the bolts 23, 23a is a stator housing 26 which includes a cooperating end plate 27 preferably prewelded together around their periphery as at 28 to form a sealed stator unit. Within the inner space defined between the stator housing 26 and the outer casing 15 is formed a hydraulic fluid reservoir for supplying the hydraulic fluid to the interior of the stator housing when braking is required (note oil level shown in FIGURE 8 of the drawings).

Figure 3:
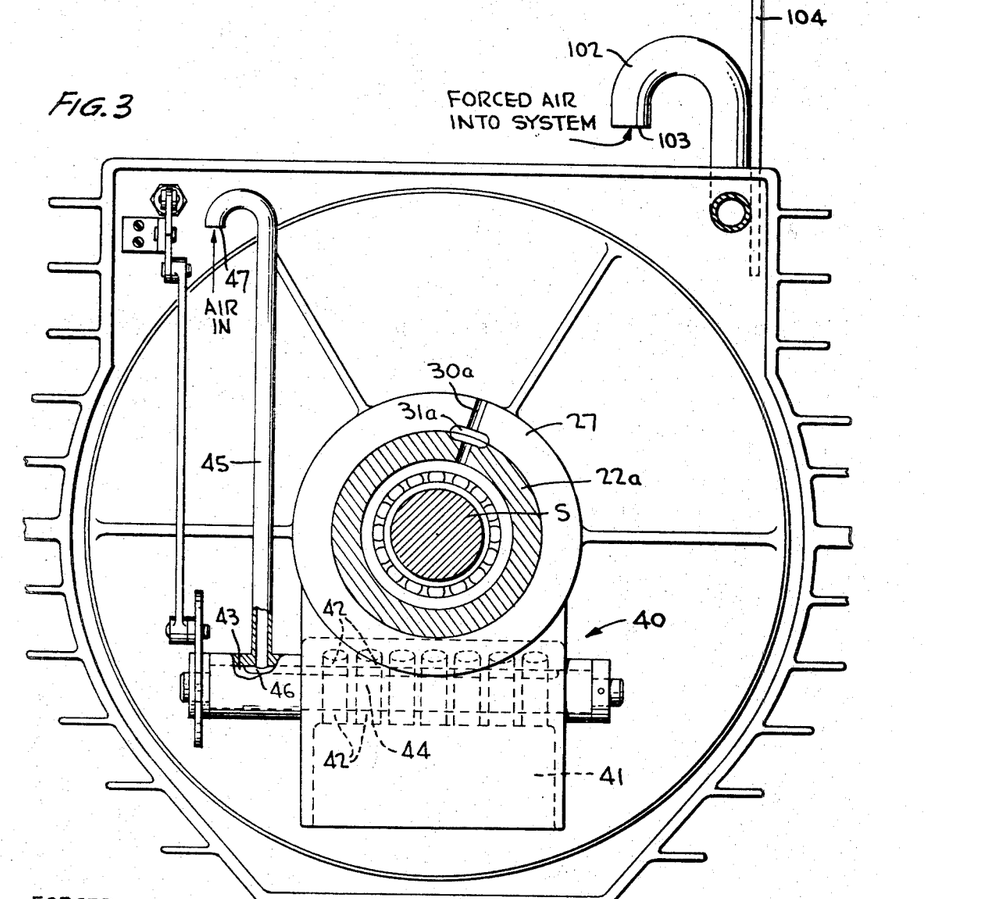
FIGURE 3 is an end view of the hydrodynamic brake with the end cover removed and showing the loading valve structure.

Opening below the oil level in this reservoir is a pair of bearing wash channels 30, 30a which lead to the respective bearings 20, 20a to constantly lubricate and cool the same with oil from said reservoir. As can be seen in both FIGURES 2 and 3, the wash passage 30a extends through both the core of the cover plate 27 and the mounting sleeve 22a and is assured of being interconnected by an enlarged arcuate interface passage 31a; it being understood that the bearing wash passage 30 is similarly constructed with an interface passage 31. The flow path for the oil to the bearings 20, 20a is completed through slots 32, 32a in the respective locking nuts 24, 24a and suitable oil seals 33, 33a are positioned by the locking nuts 24, 24a so that the flow of bearing wash oil is in the direction of the flow arrows shown in FIGURE 2.

Impeller or impeller type turbine 35 of the brake 10 has a central hub portion 36 which is suitably attached to a steel mounting sleeve 37 that is in turn connected in driving relationship with the shaft S through a key 38. The impeller 35 is axially constrained in position on the shaft S by a pair of snap rings 39 which abut against the ends of the hub 36, as illustrated in FIGURE 2. Upon rotation of the shaft S and the impeller 35, it can be seen that the oil flowing down through the bearings 20, 20a tends to creep outwardly along the hub 36 by centrifugal force so that a constant flow of bearing wash oil is present. A restricting ring 39a may be provided adjacent the roller bearing 20a to restrict the flow path at the rear end of the impeller 35 to prevent the swamping of the bearing 20a.

Formed on the lower half of the end plate 27 is a loading valve assembly 40 through which oil is admitted from the reservoir to the interior of the stator housing 26. The assembly 40 includes an integrally formed intake duct 41 at the top of which is formed a number of upwardly extending flow passages 42. A rotative valve member 43 having cooperating transfer passages 44 intersects the flow passages 42 (note FIGURES 2 and 3), and it is clear that in the position shown in FIGURE 2, the valve 40 is open so as to allow loading of the oil into the housing 26 since the transfer passages 44 in the rotative valve member 43 are aligned with the passages 42. On the other hand, when the valve member is rotated so that transfer passage 44 is at an angle to the flow passage 42, the oil supply is progressively restricted until at 90° rotation, the valve 40 is in the completely closed position. In this position, air is capable of being admitted through an air pipe 45 and an interconnecting slot 46 that extends along the length of the rotative valve member 43 to one or more of the passages 42 to unload or replace the oil in the stator housing 26 and thus disengage the brake. The air pipe 45 has an opening 47 which communicates with the air chamber formed by the interior of the casing 15 above the level of the oil in the reservoir.

Figures 4, 4A, 5:
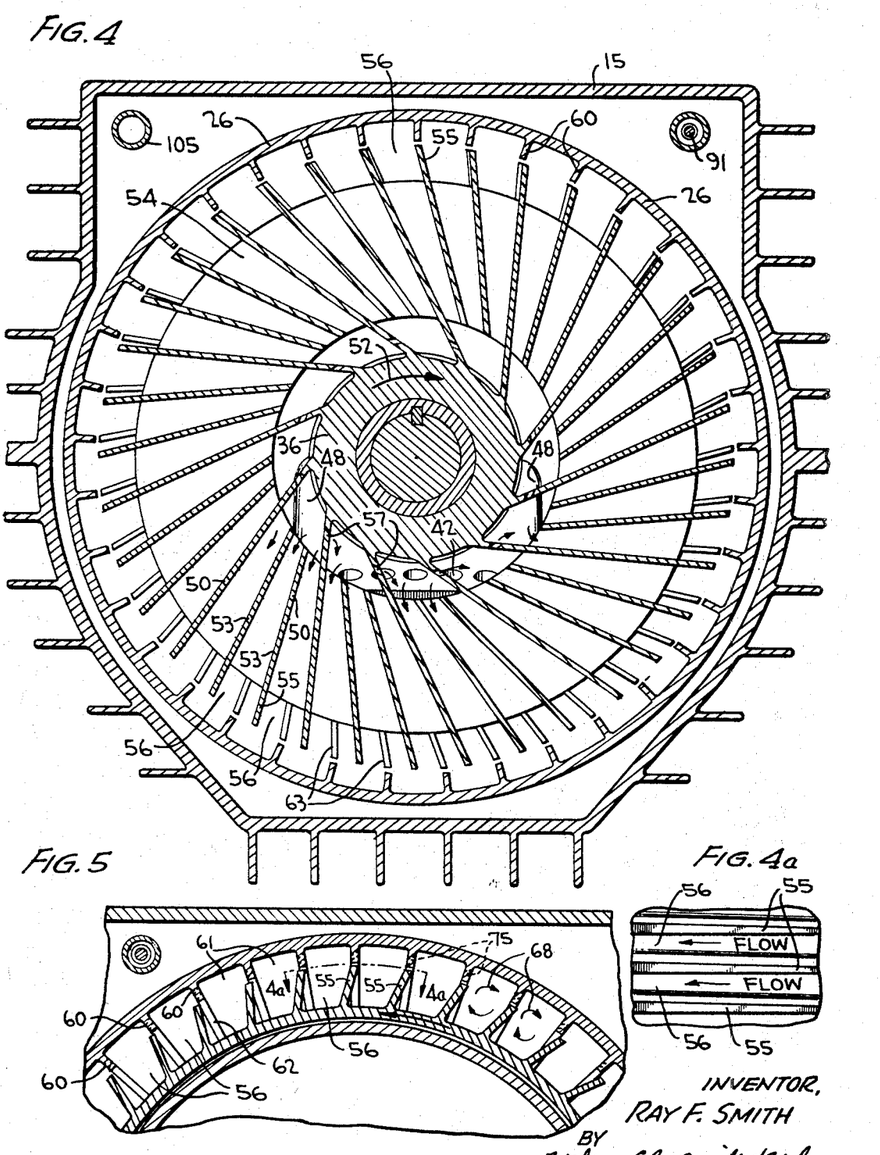
FIGURE 4 is a cross-sectional view taken along line 4—4 of FIGURE 2 showing the vane structure of the impeller and stator housing.
FIGURE 4a is a detailed view showing the tapered construction of the rotor vanes.
FIGURE 5 is a cross-sectional view taken along line 5—5 of FIGURE 2 showing the cooperating pockets in detail.

An intake transfer chamber 48 is formed directly above the passages 42 (note FIGURE 2) which, as can be seen in FIGURE 4, extends upwardly to the center of the hub 36 so as to give an extended area of communication between the incoming fluid and the impeller type turbine 35. The pumping action for actually bringing the oil in the reservoir up through the valve assembly 40 and the intake transfer chamber 48 and into the impeller 35, is generated along the face of said intake transfer chamber 48 by the base of the long pumping blades 50 that emanate from the hub 36. These blades 50 are equally spaced around said hub 36 and are formed at a reclining angle with respect to the direction of rotation, which is noted by the arrow 52, to increase the velocity of the fluid flowing radially outward through the impeller type turbine 35. Interposed between the spaced pumping blades 50 are intermediate driver blades 53 to further accelerate and guide the fluid toward the outer working periphery of the impeller 35.

The blades 50, 53 are connected at their rear face by a circular disc 54 (note FIGURES 1 and 4) which serves to reinforce the blades and to properly limit the communication between the intake chamber 48 and to the spaces between the blades 50 (see FIGURE 4). All of the impeller blades 50, 53 terminate in outwardly extending rotor vanes 55 which extend in a direction perpendicular to the blades 50, 53, or in other words, the rotor vanes 55 extend for a selected working length parallel to the central axis of the brake 10 (note FIGURE 2). These rotor vanes 55 thus define a plurality of elongated rotor pockets 56 therebetween, as can be best noted in FIGURE 4 of the drawings, and the function of which will later be discussed.

In accordance with one aspect of the present invention, passages 57 are formed in the base of each of the blades 50 to allow transfer of fluid between adjacent pumping spaces and to thereby prime each successive space with a small quantity of fluid as the blades 50 traverse the face of the intake chamber 48 (see FIGURE 4). To explain, these primer passages 57 are directed at an angle so as to be directed generally outwardly away from the intake chamber, as shown in FIGURE 2, and as each individual pumping blade 50 passes said intake chamber 48 with the impeller rotating in the direction of the arrow 52, it can be seen that a defined jet of fluid is generated through the passages 57 in the rearward and outward direction which causes the priming action. The jet of fluid formed by such transfer is then operative to entrain more fluid as the blades 50 progressively traverse the intake chamber 48, and as a consequence, the loading characteristics of the impeller 35 are generally enhanced, in fact, due to the formation of these passages 57, the spaces between the blades 50, 53 are insured of being completely flooded with fluid in the shortest possible time so that a maximum amount of fluid is available for shearing and turbulence at the rotor pockets 56, as will later be explained. Furthermore, it has been found that the fluid entering each successive space between the blades 50 and acted upon by the jets from these passages 57 tends to have a substantial amount of turbulence in the form of radially extending spirals, which fact further improves the loading properties of the fluid as well as generally increasing the turbulence in the stator housing 26 thus discouraging any tendency toward the complete loss of turbulence and channeling of the fluid that might otherwise result.

As illustrated in FIGURES 2 and 4a, the turbulent flow path along the rotor pockets 56 is generally from right to left or from the rear face, on which the blades 50, 53 are formed, to the remote end thereof. That is, the overall flow pattern of the turbulent fluid is from right to left in FIGURE 4a, and to insure that the fluid in this area is free of cavitation or air bubbles the static pressure in the fluid is gradually increased due to the fact that the blades 55 are tapered in the reverse direction or from left to right, as illustrated in this figure. In addition, the formation of the rotor vanes 55 so that the rotor pockets 56 narrow at the remote end aids in expelling the fluid from the stator housing 26 due to this increase in pressure of the fluid that encourages radially outward movement from the rotor pockets 56.

Positioned around the inside periphery of the stator housing 26 is a plurality of spaced stator vanes 60 which form a plurality of inwardly facing pockets 61 that cooperate with the rotor pockets 56 to form the turbulent flow path, as can be noted in FIGURES 2 and 4. As can best be seen in FIGURE 5, the tips of the rotor blades 55 are separated from the stator vanes 60 by a small clearance and that upon rotation of the impeller 35 the fluid within the opposed pockets 61, 56 becomes turbulent by constant interaction and shearing of the fluid molecules so as to give the brake 10 its necessary brake horsepower characteristics, which action is effected by several important factors in the construction of the vanes 55, 60, as will now be specifically pointed out.

Thus, the remote ends of the stator vanes 60 extend around the terminal ends of the rotor vanes 55 so as to form vane segments 62, as can best be seen in FIGURE 2. At the opposite end of the vanes 60 and formed in the interior face of the cover plate 27 are vane segments 63; it being understood that both the vane segments 62 and 63 are aligned with the vanes 60 (note FIGURES 4 and 5, respectively). Due to the presence of these vane segments 62, 63, there is created separate vortex action areas 64, 65 at the respective ends of the flow path along the pockets 56, 61 that interact with a central vortex region 66 so as to give particularly efficient back and forth exchange of fluid along the flow path. In addition to this type of vortex action along the length of the flow path, there is a considerable vortex action at 90° with respect thereto due to the movement of the tips of the rotor vanes across the stator pockets, as denoted by the arrows 68 in FIGURE 5. It has been found that with the combination of these different vortex forces, the turbulence in the brake 10 is of a self-sustaining nature and more highly efficient than has heretofore been attainable with prior art apparatus.

As the tips of the rotor vanes 55 pass over the stator pockets 61 upon rotation of the impeller 35 as just described, there is, of course, a momentary increase in pressure in the individual stator pockets 61 so as to create a pulsing effect. In order to prevent a tramping effect from the simultaneous addition of these separate pressure changes that might result in an undesirable pulsing of the impeller 35 and jerking of the drive shaft S to which the brake 10 is attached, the number of stator vanes 60 and rotor vanes 55 is selected so as to be different in number. This insures that the rotor vanes 55 and the stator vanes 60 are not aligned in any rotative position of the impeller 35 or in other words, are always out of step with each other. Thus, in the preferred embodiment illustrated, the number of rotor vanes 55 has been selected as an even number whereas the number of stator vanes 60 has been selected as an odd number giving the arrangement shown in FIGURE 4, and as a result, as the impeller 35 rotates past stator pockets 61, the pressure is constantly increasing and decreasing in each of the successive stator pockets 61 at different times thus insuring that the tramping effect does not occur.

The peripheral discharge means in the stator housing 26 preferably takes the form of an upper series of ejection ports 70 and two lower series of ejection ports 71, 72, as can best be seen by comparison of FIGURES 2 and 5. With this arrangement, removal of the oil from the stator casing occurs at three spaced positions around the periphery of the housing for a more consistent removal of the fluid and to encourage constant flow through the brake. Also, with a plurality of discharge points around the periphery of the housing 26, the working pressures are capable of being lowered to approximately 5 lbs./sq. in. and better pressure balance around the housing 26 is realized while still maintaining the required turbulent action in the fluid.

Figures 6, 7:
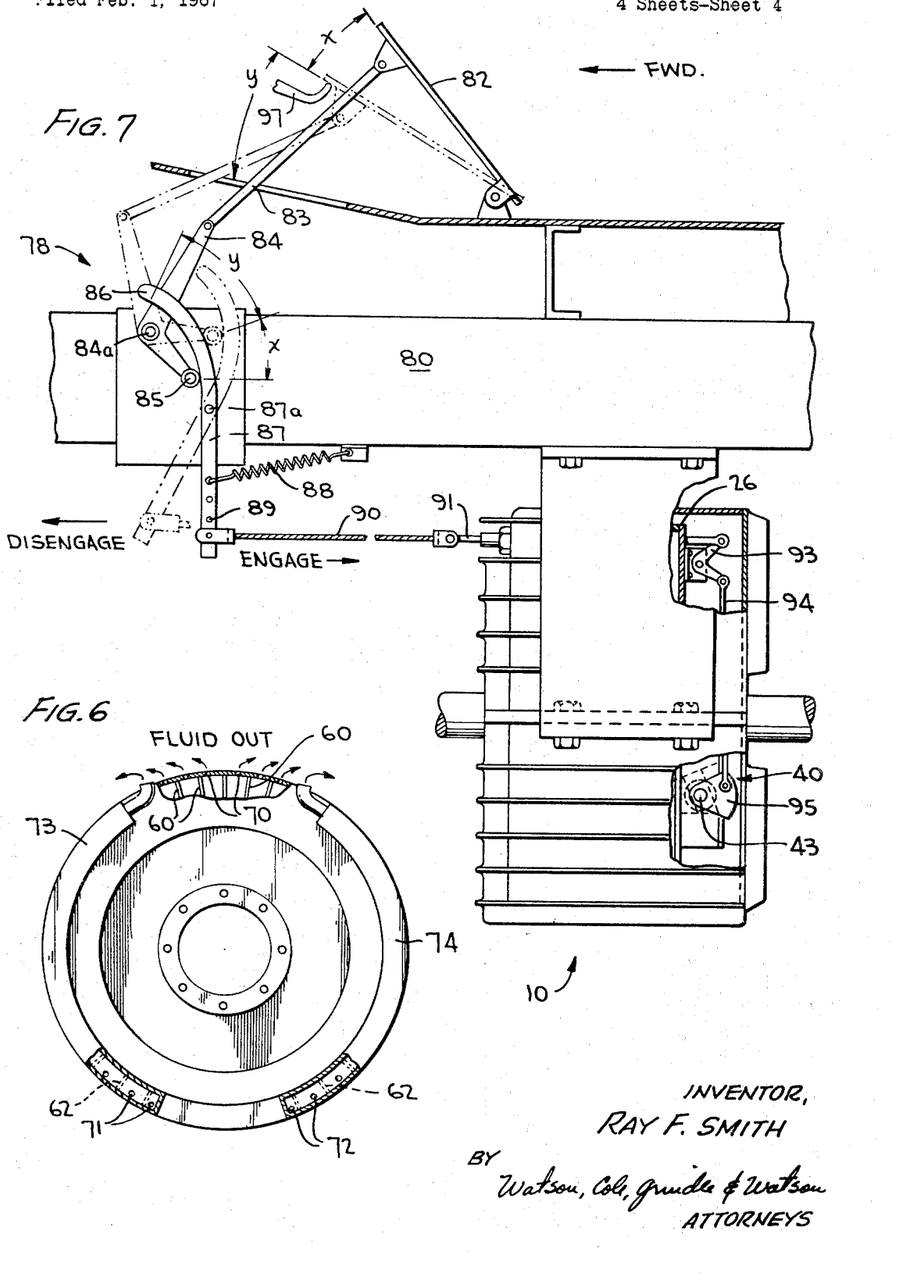
FIGURE 6 is an end view of the stator housing with parts broken away to show the peripheral discharge means.
FIGURE 7 is a schematic diagram of the automatic control for the hydrodynamic brake shown in the previous figures.

While the series of ports 70 are positioned in the outer annular wall of the housing 26, the ports 71, 72 are positioned in the outer face of the housing 26, as can be noted in FIGURE 6, and a pair of transfer chambers 73, 74 is associated with the latter ports 71, 72, respectively, so that the oil egressing from these ports during the unloading operation is transferred to a point above the level of the oil in the reservoir. This means that the heated oil is cooled before it is returned to the working cycle within the stator housing 26, and perhaps more importantly, prevents retrogression of the fluid through these ports 71, 72 when the brake 10 is unloaded and in the disengaged mode.

Thus, to consider the overall operation of the brake 10, when the valve assembly 40 is opened to admit oil into the stator housing 26, the oil will be pumped outwardly, as indicated by the flow arrows in FIGURE 2, and will be forced across the turbulent flow path defined by the vortex regions 64–66 and finally expelled through the ejection ports 70–72. During this operation it is important, as pointed out above during the discussion of the primer passages 57, that the turbulence along the flow path be maintained so that the channeling effect does not occur at any speed in the design speed range of the brake. This is accomplished most efficiently in the present invention by providing in each of the stator vanes 60, a passageway 75 which allows controlled transfer of the oil between adjacent stator pockets 61. As shown in FIGURE 2, these passageways 75 are positioned adjacent the terminal end of the flow path or in the vicinity of the ejection ports 70–72. These passageways 75, in effect, simply allow the transfer of fluid between the stator pockets 61 so that it does not become trapped therein which could otherwise cause the channeling effect; the predominant exchange of fluid through the passageways 75 being around the stator housing 26 in a counterclockwise direction as viewed in FIGURE 5, due to the action of the blades 55 moving past the pockets 61. Also, the passageways 75 are formed so as to be skewed or angled from the outside of the vanes 60 to the inside and toward the periphery of the stator housing 26. This reverse directioning of the passageways 75 with respect to the flow path along the pockets 56, 61 encourages the vortex action at 64 within the stator pockets 61 so as to further improve the overall turbulent condition of the fluid and consequently to further discourage unwanted channeling of the fluid. Also, because of the travel of a certain quantity of fluid through these passageways 75, the used fluid in the stator pockets 61 is being constantly moved toward the ejection ports 70–72 for more efficient discharge from the stator housing 26.

The selection of the size of these passageways 75 has been found to materially affect the braking capacity of the brake 10 in that with larger passageways the fluid is capable of more freely flowing from one pocket to another and thus affording generally less resistance to the turning of the impeller 35. Generally speaking, a passageway of approximately .250 inch has been shown to give good transfer between the stator pockets 61 to prevent the trapping of the fluid while at the same time not mitigating from the high efficiency of the turbulent action of the fluid. It will thus be realized that this affords a simple manner in which the characteristics of a brake 10 can be varied within certain limits to fit the specialized requirements of a particular vehicle.

With reference now to FIGURE 7 of the drawings, there is illustrated a control linkage system, generally designated by the reference numeral 78, which is for operating the brake 10 and which provides another feature of the invention. Thus, the truck T may be considered to have a frame 80 with a suitably supported floorboard 81 and a usual pivoted accelerator 82 mounted thereon. Pivotally connected to the accelerator 82 is a drive rod 83 which extends through a hole in the floorboard 81 and is pivotally connected at the other end to a control lever 84 which is operative to be pivotally actuated about a pivot pin 84a. At the remote end of the control lever 84 is a roller element 85 that engages an arcuate portion 86 of an actuator lever 87 that is pivotally mounted on the pivot pin 87a. The actuator lever 87 is biased in the counterclockwise direction by a spring 88 so that the arcuate portion 86 is constantly held in engagement with the roller 85. At the lower end of the lever 87 there is provided a series of adjustment holes 89 through which an actuating cable 90 is selectively attached. The cable 90 is, in turn, connected to a horizontal connecting rod 91 that extends within the upper portion of the brake 10 and is connected to a bell crank 93 mounted for pivotal movement on the rear of the stator housing 26. The movement of the bell crank 93 operates a vertical shift rod 94 that pivotally connects to a counterweight segment 95 fixed on the end of the rotative valve member 43 of the loading valve assembly 40.

As shown in FIGURE 2 and in the full line view of FIGURE 7, the valve member 43 is normally rotated in the full clockwise direction by action of the counterweight segment 95 so that the flow passages 42 are open and oil from the reservoir is being admitted to the rotor housing 26. In this condition, the brake 10 is engaged and, as will be noted, the accelerator 82 is in the full retracted position. When it is desired to disengage the brake, the driver-operator merely proceeds to operate the accelerator 82 through a distance equal to about one-third its total travel, or the distance indicated by the reference indicia X in this figure.

When the accelerator 82 is thus moved to the dotted line position, the control lever 84 will be pivoted in the counterclockwise direction to cause the roller element 85 to, in turn, bias the actuator lever 87 in the clockwise direction about its pivot pin 87a. It should be noted at this point that this initial movement has also been noted by the reference indicia X along the arcuate portion 86 and is possible through the critical curvature of said portion 86 and the placement of the pivot pin 87a such that the lever 87 is within the arc of movement of said roller element 85 over this distance X. After the distance X has been traveled, the arcuate portion 86 is no longer within the arc of movement of the roller element 85, but is now substantially coexistent with said arc of movement over a distance denoted by the reference indicia Y so that no further clockwise travel of the lever 87 is possible. With the lever 87 thus shifted in a clockwise direction over the distance X, the cable 90 is shifted to the left in FIGURE 7, the bell crank 93 is pivoted and the counterweight segment 95 lifted to rotate the valve member 43 toward a closed position thereby cutting off the flow of oil to the stator housing and thus disengaging the brake, all as shown by the partial dotted line outline in this figure.

As the accelerator 82 completes the distance X and thus reaches the dotted line position of FIGURE 7, it is operative to engage rod 97 which operates the feeding of the gas to the vehicle in the usual manner. It will be remembered that through this final movement Y, which is approximately two-thirds of the total movement of the accelerator pedal 82, the actuator lever 87 is held in the dotted line position or the disengaged position by the movement of the roller 85 and thus the brake 10 is held in the disengaged position to allow free travel of the truck T. When the driver of the truck T again wishes to engage the brake, he simply releases the accelerator 82 to the full line position wherein the actuator lever 87 is returned to its full line position. It is pointed out that the provision of the counterweight segment 95 insures that the brake 10 of the present invention is in the engaged position at any time that the accelerator pedal 82 is released, and that due to the fact that there is thus no reliance on any springs or the like to perform this action, the same is reliable and foolproof.

Figure 8:
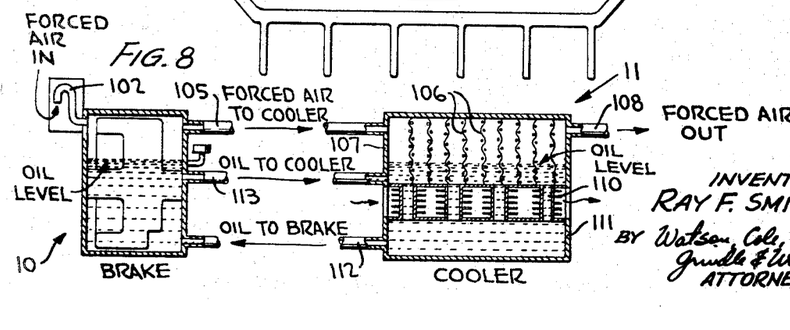
FIGURE 8 is a schematic flow diagram showing the details of the forced air cooling system employed with the hydrodynamic brake of the present invention.

The structure and function of the forced air cooling system of the present invention is best shown in the schematic diagram of FIGURE 8. To admit air to the interior of said brake 10, there is provided at the front of the brake 10 an air inlet pipe 102 communicating with the inner air chamber through the wall of the casing 15 and having a downwardly directed opening 103 (note also FIGURE 3). A shield 104 may be attached to the pipe 102 to deflect the air from the fan 12 into the opening 103; it being remembered that the fan 12 is located immediately in front of the brake 10 and thus generally directs a circulating body of air in line with said opening 103 (note FIGURES 1 and 2). Accordingly, it will be realized that during operation, the fan 12 is constantly forcing air into the opening 103 at an increased pressure so that there is superatmospheric pressure in the air chamber of the casing 15.

At the rear of the casing 15 of the brake 10 is a transfer pipe 105 that is connected to a secondary air chamber formed above the oil level of the blowdown and cooling unit 11, as noted. The air from the air chamber of the brake 10 is thus constantly forced to cooler unit 11 by this superatmospheric pressure, and any mist or oil vapor created by the unloading operation of the brake 10 is advantageously collected on a series of vertical screens 106 disposed in upper section 107 of said cooler unit 11. After being separated from the oil by these screens 106, the air is then forced out exhaust pipe 108 into the atmosphere. This separating arrangement has been found to greatly reduce the loss of oil since a large proportion of that which would otherwise be lost in mist or vapor is recovered. Further, this forced air flow through the system in effect accomplishes a significant amount of cooling of the oil.

Immediately below the upper section 107 of the cooler unit 11 are a series of vertical finned tubes 110 which serve to further cool the oil as it passes into a lower section 111. From the lower section 111, the oil is returned to the brake 10 through a transfer conduit 112 which connects to said brake 10 at the bottom of the reservoir and immediately adjacent the intake duct 41 of the loading valve 40. This means that the cool oil from the cooler unit 11 is positioned to be drawn into the stator housing 26 upon initiation of the next loading operation of the brake 10. A transfer conduit 113 connects the upper portion of the reservoir of the brake 10 to the upper section 107 of the cooler 11 so as to transfer the heated oil into said cooler 11.

It should now be realized that there are many advantages of the present invention, as they have been specifically considered in the foregoing discussion. Obviously, one advantage is the provision of the primer passages 57 in the impeller 35 and the passageways 75 in the stator vanes that insure efficient and reliable operation of the hydrodynamic brake 10 over a full range of speeds. Further, the design of rotor and stator vanes 55, 60 of the brake 10 has been shown to be highly significant in maintaining the required turbulence. Also, it has been shown to be possible to operate at significantly lower fluid pressures than has heretofore been possible by provision of a plurality of spaced ejection ports 70–72 around the periphery of the stator housing. Finally, improvement in the association cooling and control systems assures a more economical and safer operation of the brake 10 thus giving a truly integrated braking system which is particularly adapted for automotive application.

In this disclosure, there is shown and described only the preferred embodiment of the invention, but, as aforementioned, it is to be understod that the invention is capable of various changes or modifications within the scope of the inventive concept as expressed by the accompanying claims.

I claim:

1. A hydrodynamic brake comprising a stator housing having a plurality of circumferentially spaced stator vanes forming a plurality of substantially radially inwardly facing fluid pockets around the inside periphery of said housing, said housing having a fluid intake port adjacent the central axis of said housing and peripheral discharge means, an impeller journaled for rotation with respect to said housing, said impeller having a plurality of outwardly extending spaced rotor vanes, said rotor vanes being in radially substantially constantly spaced relationship with respect to said stator vanes for shearing of hydraulic fluid between the same, said rotor vanes forming a plurality of substantially radially outwardly facing rotative fluid pockets for cooperation with said stator pockets, said stator and rotative pockets defining a portion of a path of fluid turbulence between said intake port and said peripheral discharge means, and passageway means formed in at least some of said stator vanes and spced from the inner limit of said vanes providing separate fluid communication between the respective pockets whereby the fluid in said pockets is capable of being directly transferred between adjacent pockets upon rotation of said impeller so as to prevent trapping of said fluid in said pockets and channeling of said fluid.

2. The combination of claim 1 wherein is further provided a plurality of pumping blades extending outwardly along the face of said impeller adjacent said intake port, said blades interconnecting with at least some of said rotative vanes and the space between said blades forming the remainder of said flow path, passage means formed in the base of said pumping blades adjacent said intake port, said passage means being directed outwardly toward said pockets and in the direction of rotation of said impeller so as to allow direct transfer of fluid between said blades to prime each successive space in the direction of rotation of the impeller.

3. The combination of claim 1 wherein is further provided an outer casing enclosing said stator housing and forming a fluid reservoir surrounding the same, said pheripheral discharge means comprising a plurality of series of ejection ports communicating with selected ones of said stator pockets, each of said series being peripherally spaced from the other around said stator housing to give multiple discharge points, and transfer chamber means connected to said ejection ports below the level of the fluid in said reservoir and opening above said level to prevent retrogression of said fluid through said ejection ports.

4. The combination of claim 1 wherein said rotor vanes are tapered along the length in the reverse direction to said flow path whereby to gradually increase the pressure adjacent said discharge means to thus prevent cavitation effect and aid in discharge of said fluid.

5. The combination of claim 1 wherein is further provided stator vane segments mounted on said stator housing in alignment with said stator vanes at the ends of said pockets to generate defined vortex areas in said flow path adjacent said ends whereby to enhance the turbulence in said pockets.

6. The combination of claim 1 wherein said passageway means are formed in said stator vanes adjacent said peripheral discharge means whereby said fluid is transferrable between said stator pockets to aid in discharge of said fluid.

7. The combination of claim 6 wherein said passageway means are positioned at an angle with respect to said peripheral discharge means so as to direct the transferred fluid in the reverse direction with respect to the flow path along said pockets to aid in maintaining the desired turbulence of said fluid.

8. A hydrodynamic brake and cooling system for use with the drive shaft of a vehicle comprising a stator housing having a plurality of circumferentially spaced stator vanes, an impeller connected to said drive shaft and journaled for rotation with respect to said stator housing, said impeller having a plurality of outwardly extending spaced rotor vanes, said rotor vanes being in radially spaced relationship with respect to said stator vanes for shearing of hydraulic fluid between the same, an outer casing enclosing said stator housing and forming a fluid reservoir surrounding the same and an air chamber above the level of said fluid, an air inlet in said casing above the fluid level communicating with the atmosphere, a valve in said stator housing and communicating with said fluid reservoir, said valve having a rotative valve member in said housing to admit fluid into said housing when opened to perform the loading operation of said brake, an air intake on said housing opening in an air chamber above said fluid level and being connected to said valve housing, an auxiliary air passageway in said valve member connecting said air intake to said housing to replace the fluid in said housing with air when said valve member is in closed position to perform the unloading operation, a fluid cooler and blowdown unit forming a secondary air chamber and fluid reservoir, air connecting means between said air chambers and an air exit formed in said secondary air chamber, fluid circulation means connecting said cooler unit and said outer casing, screen means in said secondary air chamber to collect said fluid from blowdown resulting from said unloading operation, and means at said air inlet for forcing air through said air chambers and out said air exit to maintain superatmospheric air pressure in said system during operation to aid in cooling of said fluid.

9. The combination of claim 8 wherein said blowdown and cooler unit comprises upper and lower sections and vertical, finned cooling tubes connecting the same to cool the fluid as it passes between said sections.

10. The combination of claim 8 wherein said means for forcing air through said system comprises a fan mounted on said drive shaft in front of said outer casing, said air inlet opening adjacent said fan whereby air is forced through said system and simultaneously circulated around the outer surface of said system for cooling.

11. The combination of claim 8 wherein is further provided bearings for rotatably mounting said stator housing with respect to said drive shaft and bearing wash channels formed in said housing for transfer of fluid from said reservoir to said bearings to effect continuous lubrication and cooling of the same.

12. A hydronamic brake for an automotive vehicle having an eccelerator comprising a stator housing having a plurality of circumferentially spaced stator blades, an impeller connected to said drive shaft and journaled for rotation with respect to said stator housing, said impeller having a plurality of outwardly extending spaced rotor vanes, said rotor vanes being in radially spaced relationship with respect to said stator vanes for shearing of hydraulic fluid between the same, an outer casing enclosing said stator housing and forming a fluid reservoir surrounding the same, a valve in said stator housing and communicating with said fluid reservoir, said valve having a rotative valve member in said housing to admit fluid into said housing when opened to perform the loading operation of said brake, air passageway means in said valve member for admitting air to said stator housing to replace the fluid in said housing when said valve member is in closed position to perform the unloading operation, and control means interconnecting said valve member to the accelerator of said vehicle comprising a pivotal control lever connected to the accelerator at one end and having an engaging element at the other end, a pivotal actuator lever mounted for movement about a pivot axis parallel to the pivot axis of said control lever, said actuator lever having an arcuate portion for engagement with said element, said arcuate portion being on the inside of the arc of movement of said element through approximately the first one-third movement of the accelerator and substantially on said arc of movement thereafter, and linkage means connecting said actuator lever to said valve member so as to progressively close said valve across said first one-third movement and to hold the same closed thereafter.

13. The combination of claim 12 wherein said linkage means includes a counterweight fixed on said valve member for rotation therewith and positioned so as to cause an opening of said valve by gravity when the accelerator is released whereby the brake will be engaged at all times except when the accelerator is in use.

14. A hydrodynamic brake comprising a stator housing having a plurality of circumferentially spaced stator vanes forming a plurality of substantially radially inwardly facing fluid pockets around the inside periphery of said housing, said housing having a fluid intake port adjacent the central axis of said housing and peripheral discharge means, an impeller having a base mounted on a shaft journaled for rotation with respect to said housing, said impeller having a plurality of outwardly extending spaced rotor vanes, said rotor vanes being in radially spaced relationship with respect to said stator vanes for shearing of hydraulic fluid between the same, said rotor vanes forming a plurality of substantially radially outwardly facing rotative fluid pockets for cooperation with said stator pockets, said stator and rotative pockets defining a portion of a path of fluid turbulence between said intake port and said peripheral discharge means, and a plurality of pumping blades extending outwardly from the base of the impeller along the face of said impeller adjacent said intake port, said blades interconnecting with at least some of said rotative vanes and the space between said blades forming the remainder of said flow path, passage means formed in said pumping blades adjacent said base and said intake port, said passage means being directed outwardly toward said pockets and in the direction of rotation of said impeller so as to allow direct transfer of fluid between said blades to prime each successive space in the direction of rotation of the impeller.

15. The combination of claim 14 wherein is further provided an outer casing enclosing said stator housing and forming a fluid reservoir surrounding the same, said peripheral discharge means comprising a plurality of series of ejection ports communicating with selected ones of said stator pockets, each of said series being peripherally spaced from the other around said stator housing to give multiple discharge points, and transfer chamber means connected to said ejection ports below the level of the fluid in said reservoir and opening above said level to prevent retrogression of said fluid through said ejection ports.

16. The combination of claim 14 wherein is further provided passageway means formed in said stator vanes providing separate fluid communication between the respective pockets whereby the fluid in said pockets is capable of being directly transferred between adjacent pockets upon rotation of said impeller so as to prevent trapping of said fluid in said pockets and channeling of said fluid.

17. The combination of claim 16 wherein is further provided stator vane segments mounted on said stator housing in alignment with said stator vanes at the ends of said pockets to generate defined vortex areas in said flow path adjacent said ends whereby to enhance the turbulence in said pockets.

18. The combination of claim 17 wherein the number of rotor vanes and stator vanes differs by one, whereby to prevent tramping effect during operation.

19. A hydrodynamic brake comprising a stator housing having a plurality of circumferentially spaced stator vanes forming a plurality of substantially radially inwardly facing fluid pockets around the inside periphery of said housing, said housing having a fluid intake port adjacent the central axis of said housing and peripheral discharge means, an impeller journaled for rotation with respect to said housing, said impeller having a plurality of outwardly extending spaced rotor vanes, said rotor vanes being in radially spaced relationship with respect to said stator vanes for shearing of hydraulic fluid between the same, said rotor vanes forming a plurality of substantially radially outwardly facing rotative fluid pockets for cooperation with said stator pockets, said peripheral discharge means being formed at one end of said pockets, said stator and rotative pockets defining a portion of a path of fluid turbulence between said intake port and said peripheral discharge means, a plurality of pumping blades extending outwardly along the face of said impeller adjacent said intake port, said blades interconnecting with at least some of said rotating vanes at the end of said vanes opposite the peripheral discharge means, said blades forming radial spaces defining the remainder of said flow path, said flow path being L-shaped and being the only path of travel of working fluid in said brake, stator vane segments mounted on said stator housing in alignment with said stator vanes at the ends of said pockets to generate defined vortex areas in said flow path adjacent said ends whereby to enhance the turbulence in said pockets.

20. The combination of claim 19 wherein is provided passageway means formed in at least some of said vanes providing separate fluid communication between the respective pockets whereby the fluid in said pockets is capable of being directly transferred between adjacent pockets so as to equalize the pressure between said pockets, said passageway means being formed in said stator vanes adjacent said peripheral discharge means whereby transfer of said fluid also aids in discharge of said fluid.

21. The combination of claim 20 wherein the stator vane segments at the end of said pockets adjacent said passageway means are formed integrally with said stator vanes so as to extend around the adjacent end of said rotor vanes thereby forming a continuous L-shaped vane, said passageway means being formed adjacent the bight of the L whereby flow of fluid between said stator pockets is limited to flow through said passageway means.

22. A hydrodynamic brake for use with a rotative shaft comprising a stator housing having a plurality of circumferentially spaced stator blades, an impeller connected to said shaft, said impeller being spaced from said housing to define radially extending fluid clearance spaces on opposite sides of said impeller, said impeller having a plurality of outwardly extending spaced rotor vanes, said rotor vanes being in radially spaced relationship with respect to said stator vanes for shearing of hydraulic fluid between the same, an outer casing enclosing said stator housing and forming a fluid reservoir surrounding the same, bearings for rotatably mounting said shaft with respect to said stator housing, bearing wash channels formed in said housing opening below the level of fluid in said reservoir and terminating adjacent one side of said bearings, said bearings being positioned adjacent said impeller, said fluid spaces extending from the side of said bearings opposite said wash channels outwardly to said rotor vanes whereby upon rotation of said impeller fluid passing from said reservoir to said bearings through said bearing wash channel by static head pressure is induced to creep radially outwardly through said fluid spaces by centrifugal force to insure a constant flow of fluid through said bearings for continuous lubrication and cooling of the same.

23. A hydrodynamic brake and cooling system comprising a stator housing having a plurality of circumferentially spaced stator blades, an impeller journaled for rotation with respect to said stator housing, said impeller having a plurality of outwardly extending spaced rotor vanes, said rotor vanes being in radially spaced relationship with respect to said stator vanes for shearing of hydraulic fluid between the same, an outer casing enclosing said stator housing and forming a fluid reservoir surrounding the same and an air chamber above the level of said fluid, an air inlet in said casing above the fluid level, a valve in said stator housing and communicating with said fluid reservoir, said valve having a valve member in said housing to admit fluid into said housing when opened to perform the loading operation of said brake, an air intake, means for connecting said air intake to said housing to replace the fluid in said housing with air to perform the unloading operation, a fluid cooler and blowdown unit forming a secondary air chamber and fluid reservoir, air connecting means between said air chambers and an air exit formed in said secondary air chamber, fluid circulation means connecting said cooler unit and said outer casing, means in said secondary air chamber to collect said fluid from blowdown resulting from said unloading operation, and means for forcing air through said air chambers and out said air exit to maintain superatmospheric air pressure in said system during operation to aid in cooling of said fluid.

References Cited

UNITED STATES PATENTS

| | | |
|---|---|---|
| 2,044,999 | 6/1936 | Smith et al. |
| 2,222,379 | 11/1940 | Smith. |
| 2,453,877 | 11/1948 | Trail. |
| 2,716,339 | 8/1955 | Cline. |
| 3,024,876 | 3/1962 | Montgomery. |
| 3,108,660 | 10/1963 | Smith _____________ 188—90 |

FOREIGN PATENTS

| | | |
|---|---|---|
| 1,009,991 | 3/1952 | France. |
| 685,591 | 1/1953 | Great Britain. |

MILTON BUCHLER, *Primary Examiner.*

G. E. A. HALVOSA, *Assistant Examiner.*